(12) United States Patent
Chung et al.

(10) Patent No.: US 9,216,900 B2
(45) Date of Patent: Dec. 22, 2015

(54) PREPARATION OF NITROGEN-DOPED CARBON TUBES

(75) Inventors: Hoon Taek Chung, Los Alamos, NM (US); Piotr Zelenay, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 413 days.

(21) Appl. No.: 13/220,093

(22) Filed: Aug. 29, 2011

(65) Prior Publication Data

US 2013/0048919 A1  Feb. 28, 2013

(51) Int. Cl.
| | |
|---|---|
| C01B 21/06 | (2006.01) |
| C01B 31/04 | (2006.01) |
| H01B 1/04 | (2006.01) |
| B82Y 30/00 | (2011.01) |
| C01B 31/02 | (2006.01) |
| B82Y 40/00 | (2011.01) |

(52) U.S. Cl.
CPC ............ *B82Y 30/00* (2013.01); *B82Y 40/00* (2013.01); *C01B 31/0226* (2013.01); *C01B 31/0233* (2013.01)

(58) Field of Classification Search
CPC ........ B82Y 30/00; B82Y 40/00; B82Y 10/00; B82Y 99/00; B82Y 15/00; B82Y 20/00; B82Y 5/00; H01B 1/02; H01B 1/08; H01B 1/00; H01B 1/24; H01B 1/04; C01B 31/0226; C01B 31/0253; C01B 31/0273; C01B 13/0207; C01B 31/0233; C01B 31/0446; C01B 31/0469; C01B 31/0484; C01B 3/042; C01B 13/0214; C01B 2202/20; C01B 2202/34; C01B 2202/36
USPC .............. 252/500–519.1, 519.14; 423/445 R, 423/460, 445 B; 977/842, 847, 900
See application file for complete search history.

(56) References Cited

U.S. PATENT DOCUMENTS

| | | | | |
|---|---|---|---|---|
| 5,314,532 | A | * | 5/1994 | Hughes et al. ................ 106/253 |
| 5,558,706 | A | * | 9/1996 | Sinko ............................ 106/480 |
| 7,754,183 | B2 | * | 7/2010 | Keskar et al. ............... 423/447.3 |
| 2005/0287689 | A1 | * | 12/2005 | Iwaki et al. ..................... 438/22 |
| 2008/0175780 | A1 | * | 7/2008 | Pez et al. ....................... 423/276 |
| 2010/0015033 | A1 | * | 1/2010 | Keskar et al. ............... 423/447.3 |
| 2010/0276644 | A1 | * | 11/2010 | Wolf et al. ...................... 252/512 |
| 2012/0214172 | A1 | * | 8/2012 | Chen et al. .................... 435/6.19 |

OTHER PUBLICATIONS

Becker et al. ("Efficient access to bamboo-like carbon micro and nanofibres by pyrolysis of zinc cyanamide." J Phys and Chem of Solids, 62, p. 1431-1433, 2001).*
Becker et al. ("Zinc cyanamide, Zn(CN2)" Acta Cryst., C57, pp. 347-348, 2001).*

(Continued)

*Primary Examiner* — Tri V Nguyen
(74) *Attorney, Agent, or Firm* — Klarquist Sparkman, LLP

(57) ABSTRACT

A method for synthesizing nitrogen-doped carbon tubes involves preparing a solution of cyanamide and a suitable transition metal-containing salt in a solvent, evaporating the solvent to form a solid, and pyrolyzing the solid under an inert atmosphere under conditions suitable for the production of nitrogen-doped carbon tubes from the solid. Pyrolyzing for a shorter period of time followed by rapid cooling resulted in a tubes with a narrower average diameter.

11 Claims, 13 Drawing Sheets

(56) References Cited

OTHER PUBLICATIONS

Xiaohui Liu ("Syntheses and Structures of Metal Cyanamide Compounds." Thesis presentation downloaded from http://darwin.bth.rwth-aachen.de/opus3/volltexte/2002/467/pdf/Liu_Xiaohui.pdf and presented on Apr. 24, 2002).*

Carrero-Sanchez et al., "Biocompatibility and Toxicological Studies of Carbon Nanotubes Doped with Nitrogen", Nano Letters, 2006, vol. 6, No. 8, pp. 1609-1616.

Chung et al., "Cyanamide-Derived Non-Precious Metal Catalyst for Oxygen Reduction", Electrochemistry Comm., 2010, vol. 12, pp. 1792-1795.

Gong et al., "Nitrogen-Doped Carbon Nanotube Arrays with High Electrocatalytic Activity for Oxygen Reduction", Science, 2009, vol. 323, pp. 760-764.

Liu et al., "Nitrogen-Doped Ordered Mesoporous Graphitic Arrays with High Electrocatalytic Activity for Oxygen Reduction", Angew. Chem. Int. Ed., 2010, vol. 49, pp. 2565-2569.

Meng et al., "pH-Effect on Oxygen Reduction Activity of Fe-Based Electro-Catalysts", Electrochemistry Comm., 2009, vol. 11, pp. 1986-1989.

Nagaiah et al., "Nitrogen-Doped Carbon Nanotubes as a Cathode Catalyst for the Oxygen Reduction Reaction in Alkaline Medium", Electrochemistry Comm., 2010, vol. 12, pp. 338-341.

Qu et al., "Nitrogen-Doped Graphene as Efficient Metal-Free Electrocatalyst for Oxygen Reduction in Fuel Cells", AcsNano, 2010, vol. 4, No. 3, pp. 1321-1326.

Shanmugam et al., "Efficient Electrocatalytic Oxygen Reduction Over Metal Free—Nitrogen Doped Carbon Nanocapsules", Chem. Commun., 2011, vol. 47, pp. 4463-4465.

Wiggins et al., "Effect of Nitrogen Concentration on Capacitance, Density of States, Electronic Conductivity, and Morphology of N-Doped Carbon Nanotube Electrodes", J. Phys. Chem. C, 2009, vol. 113, pp. 19082-19090.

Yang et al., "Efficient Metal-Free Oxygen Reduction in Alkaline Medium on High-Surface-Area Mesoporous Nitrogen-Doped Carbons Made from Ionic Liquids and Nucleobases", J. Am. Chem. Soc., 2011, vol. 133, pp. 206-209.

* cited by examiner

PREPARATION OF NITROGEN-DOPED CARBON TUBES

STATEMENT REGARDING FEDERAL RIGHTS

This invention was made with government support under Contract No. DE-AC52-06NA25396 awarded by the U.S. Department of Energy. The government has certain rights in the invention.

FIELD OF THE INVENTION

The present invention relates generally to the preparation of nitrogen-doped carbon tubes.

BACKGROUND OF THE INVENTION

Carbon nanotubes (CNTs) are much stronger than steel and show remarkable electrical and mechanical properties such as metallic and semiconducting behavior.

Doping of elements such as nitrogen and boron into CNTs has been shown to activate their surfaces and add additional electronic states around the Fermi level. Nitrogen-doped (N-doped) CNTs have been suggested as promising materials for applications in field emission, energy conversion, energy storage, and other applications [1]. Nitrogen-doped carbon structures such as nanotubes, graphene, and particles have been reported to show high oxygen reduction reaction (ORR) activity in alkaline media [2-8]. These reports suggest that such structures may have applications, for example, in cathodes of alkaline fuel cells, metal-air batteries, and chlor-alkali electrolysis. N-doped CNTs have been reported to have an oxygen reduction reaction activity comparable to that of a Pt/C catalyst [2], are under study for use in Li-storage and gas sensors. Toxicological studies of N-doped CNTs in rats showed significantly lower toxic response than for their undoped counter parts [9], which suggests a higher biocompatibility when they are doped compared to when they are not.

N-doped CNTs have been synthesized by classical CVD, aerosol assisted CVD, and post-treatment of pristine CNTs with ammonia gas [2]. These methods require multiple steps to dope nitrogen into the CNTs, which may limit their mass production.

There remains a need for inexpensive, simpler methods for preparing N-doped carbon tubes.

SUMMARY OF THE INVENTION

In accordance with the purposes of the present invention, as embodied and broadly described herein, the present invention includes a method for preparing nitrogen-doped carbon tubes. The method involves preparing a solution of cyanamide ($NCNH_2$) and a suitable, soluble transition metal-containing salt in a solvent, evaporating the solvent to form a solid, and pyrolyzing the solid under an inert atmosphere under conditions suitable for the production of nitrogen-doped tubes.

BRIEF DESCRIPTION OF THE DRAWINGS

The accompanying drawings, which are incorporated in and form a part of the specification, illustrate the embodiments of the present invention and, together with the description, serve to explain the principles of the invention.

DETAILED DESCRIPTION

Figure 1A:
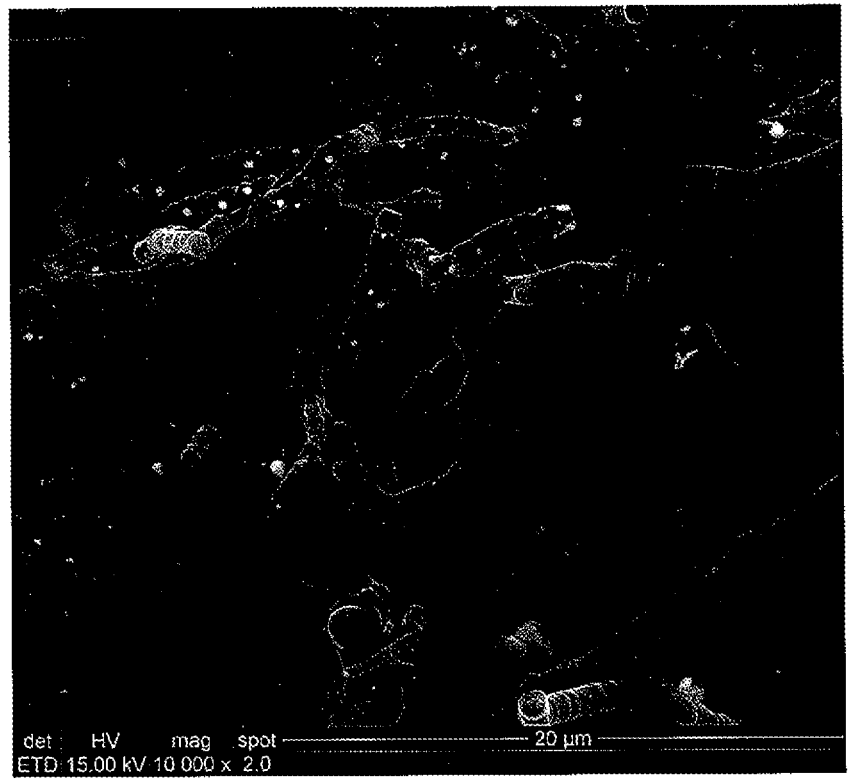
FIGS. 1a and 1b show magnified images of nitrogen-doped tubes produced using cyanamide and iron acetate in reagent grade ethanol solvent.

The invention relates to the preparation of nitrogen-doped carbon tubes. The preparation involves preparing a solution of cyanamide ($NCNH_2$, also known as aminomethanenitrile) and a suitable, soluble transition metal-containing salt in a solvent. Preparation of the solution may involve heating so that the ingredients (i.e. the cyanamide and the transition-metal-containing salt) dissolve in the solvent. Afterward, the solvent is evaporated to form a solid. The solid is pyrolyzed under an inert atmosphere to form nitrogen-doped carbon tubes. Highly-magnified images show a product that includes both metal particles and tubes. Some of these images show metal particles attached at the ends of the tubes, and that the sizes of these particles appeared to be about the same as the diameters of the tubes they were attached to. The metal particles may be removed using known treatments in the art such as treatment with acid to dissolve the metal.

Suitable salts of transition metals for preparing nitrogen-doped carbon tubes of this invention include salts of iron (Fe), cobalt (Co), and nickel (Ni). Mixtures of these salts may be used. These salts may include a variety of counterions such as, but not limited to, bicarbonate ($HCO_3^-$), carbonate ($CO_3^{-2}$), $RCO_2^-$ (for example, acetate ($CH_3CO_2^-$), formate ($HCO_2^-$), hydrogen sulfate ($HSO_4^-$), sulfate ($SO_4^{-2}$), fluoride ($F^-$), chloride ($Cl^-$), bromide ($Br^-$), and iodide ($I^-$). Carboxylate salts such as acetate are amongst those preferred because they are inexpensive materials and decompose to form carbon dioxide which does not contaminate the tubes. Iron acetate, cobalt acetate, and nickel acetate are amongst the suitable salts of transition metals for preparing nitrogen-doped carbon tubes.

Suitable solvents for this invention include, but are not limited to, ketones (acetone, for example), aromatic solvents (benzene, toluene, for example), esters (ethyl acetate, for example), acetonitrile, dimethylformamide (DMF), tetrahydrofuran (THF), dimethylsulfoxide (DMSO), chlorinated solvents (carbon tetrachloride, dichloromethane, for example), water, and alcohols (methanol, ethanol, propanol, butanol, alcohol-containing mixtures, for example), and the like. Suitable solvent mixtures may include water. Reagent grade ethanol, for example, which typically contains 90% or more ethanol along with smaller amounts of other alcohols, may be used.

Gases useful with the pyrolysis of the solid include nitrogen and argon.

The solution of cyanamide, metal salt and solvent is heated prior to evaporating the solvent. This heating is to dissolve the cyanamide and transition metal containing salt in the solvent to form a solution. Without wishing to be bound to any particular theory or explanation, it is believed that the cyanamide may form a coordination complex with the transition metal. Complexes with cyanide and transition metals are known in the art. A complex with several cyanamide molecules may form after both the transition metal complex and the cyanamide dissolve into the solvent. For convenience, heating may be performed in a round bottom flask equipped with a reflux condenser. The heating temperature may be adjusted to a temperature at or below the boiling point of the solvent. For example, a solution of cyanamide, a metal salt, and alcoholic solvent that was heated to about 60 degrees for about 1 hour was subsequently used in the preparation of nitrogen-doped carbon tubes.

When the step of dissolving the cyanamide and transition metal salt into a solvent was omitted, and pyrolysis was performed on a mixture of cyanamide and transition metal salt, the result was that no nitrogen doped carbon tubes were formed. In fact, no tubes were formed when the step of forming the solution was omitted from the process.

After preparing the solution as described above, and evaporating the solvent, the is product solid was pyrolyzed under an inert atmosphere. A suitable inert atmosphere is a nitrogen atmosphere. Another suitable inert atmosphere is an argon atmosphere. The pyrolysis may take place, for example, under a flow of nitrogen or argon gas. The solid was pyrolyzed at a temperature of 950° C., which is within an acceptable range of from 850 degrees Celsius to about 1050 degrees Celsius. Pyrolysis at around 1050 degrees Celsius is expected to product nitrogen doped carbon tubes with a nitrogen content of about 2-3%. Pyrolysis at around 950 degrees Celsius is expected to produce nitrogen-doped carbon tubes with a nitrogen content of 5-7%. It is expected that pyrolysis at temperatures much higher than 1050 degrees Celsius (e.g. at a temperature of 2500° C.) would result in graphitized carbon tubes with a negligible amount of nitrogen content.

Images of the nitrogen-doped carbon tube product were obtained. Some of these images greatly magnified (e.g. 10,000× and 100,000×) the actual size of the tubes. From the images, the lengths of the tubes were estimated to be about 100 micrometers long or longer, and the tube diameters varied from 50 nanometers to 1.2 micrometers. The variation in tube diameter depended on pyrolysis conditions and metal precursors. For example, when the precursor was placed into a furnace and the temperature was ramped rapidly and the sample was allowed to remain in the oven after the final temperature was reached, the product contained a mixture of tube diameters that included diameters wider than 1 micrometer. Alternatively, when the temperature of the furnace was set at the final temperature and the solid sample was put into the furnace at this temperature for a relatively short period of time (3 minutes) and then quickly removed and allowed to cool to ambient temperature, the product consisted of mostly or entirely of nanotubes with diameters on the narrower end of the diameter range.

The highly magnified images showed metal particles attached to the ends of the nitrogen-doped carbon tubes. The diameters of tubes were approximately the same as the sizes of metal particles attached at the ends of the tubes. This observation suggests a type of growth mechanism referred to as a tip growth mechanism, which is believed to involve tube growth at the surface of a metal particle in a direction away from the metal particle. Such a mechanism is believed to produce tubes having diameters that are about the same as the size of the particles from which they grow.

The images were examined carefully for the presence of impurities such as amorphous carbon and carbon particles. Neither amorphous carbon nor carbon particles were present in any of the images. The only things visible in the images were nitrogen-doped carbon tubes and metal particles.

The following EXAMPLES illustrate several non-limiting embodiments of the invention for preparing nitrogen-doped carbon tubes. Cyanamide was obtained from ALDRICH (99%). Metal acetates were obtained from ALDRICH. Titanium oxide was obtained from ALDRICH. Reagent alcohol was obtained from FISHER, and was a composition of ethyl alcohol (90% v/v), methyl alcohol (5% v/v) and isopropyl alcohol (5% v/v). Pyrolysis took place in a tube furnace under a flow of nitrogen gas. Nitrogen-doped tubes having a diameter of 1 micrometer or larger are considered to be microtubes. Nitrogen-doped tubes having a smaller diameter less than 1 micrometer are considered to be nanotubes.

EXAMPLE 1

Figure 1B:
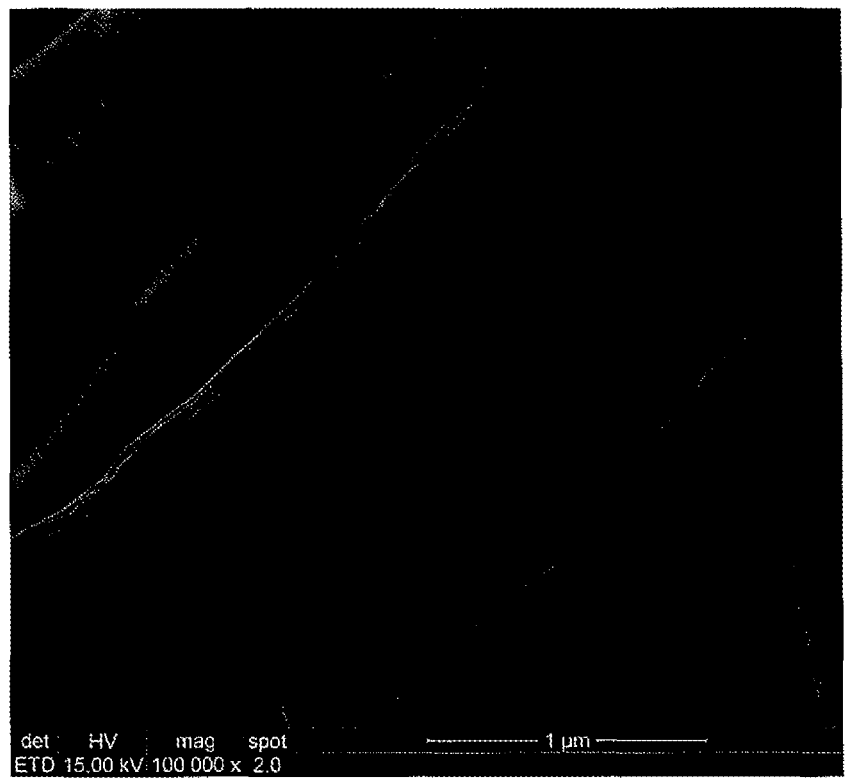

A solution of 10.0 g of cyanamide (Aldrich, 99%) and 1.5 g of iron acetate ($Fe(CH_3COO)_2$ (Aldrich, 95%) in 125 ml of reagent alcohol (Fisher, Ethyl alcohol 90% v/v, methyl alcohol 5% v/v, isopropyl alcohol 5% v/v) was prepared by stirring the mixture on a magnetic hotplate for about 12 hours at 60° C. using a condenser to prevent evaporation of the alcohol. Afterward, the solvent was evaporated from the solution on the magnetic hotplate with stirring at 45° C. overnight. The solid that was produced was pyrolyzed under an inert atmosphere of flowing nitrogen for about one hour. The pyrolysis took place in a tube furnace. The temperature of the furnace was set to a temperature of 950° C. After reaching that temperature, the solid was heated in the furnace at 950° C. After 30 minutes at 950° C., the temperature was reduced at a rate of 30° C. per minute while the inert atmosphere of nitrogen continued to flow. FIGS. 1a and 1b show highly magnified (×10,000 and ×100,000, respectively) images of the product.

EXAMPLE 2

Figure 2A:
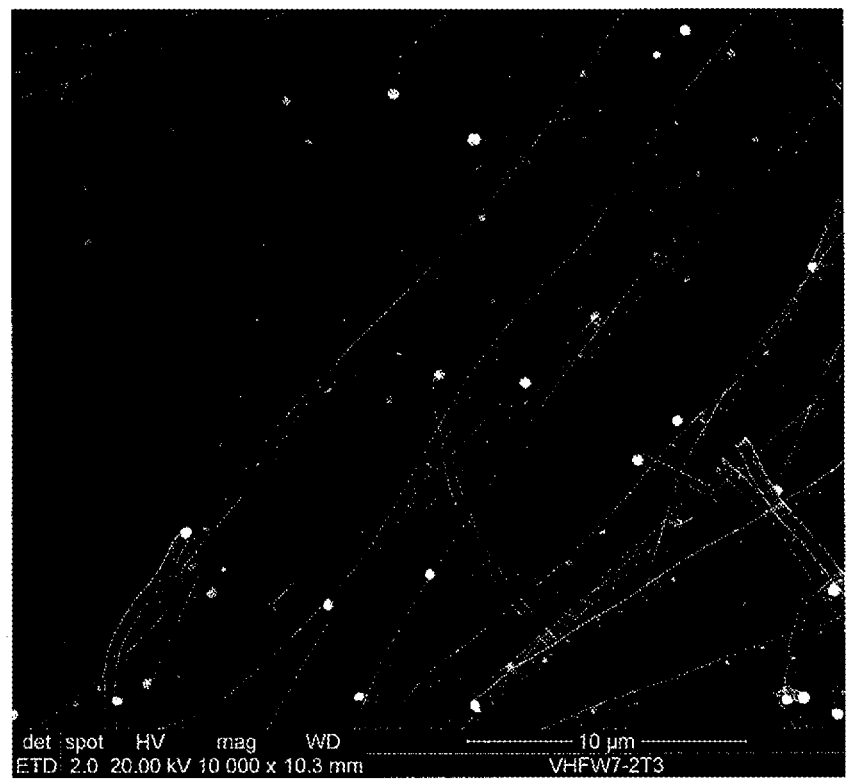
FIGS. 2a and 2b show magnified images of nitrogen-doped tubes produced using cyanamide and cobalt acetate in reagent grade ethanol solvent.
Figure 2B:
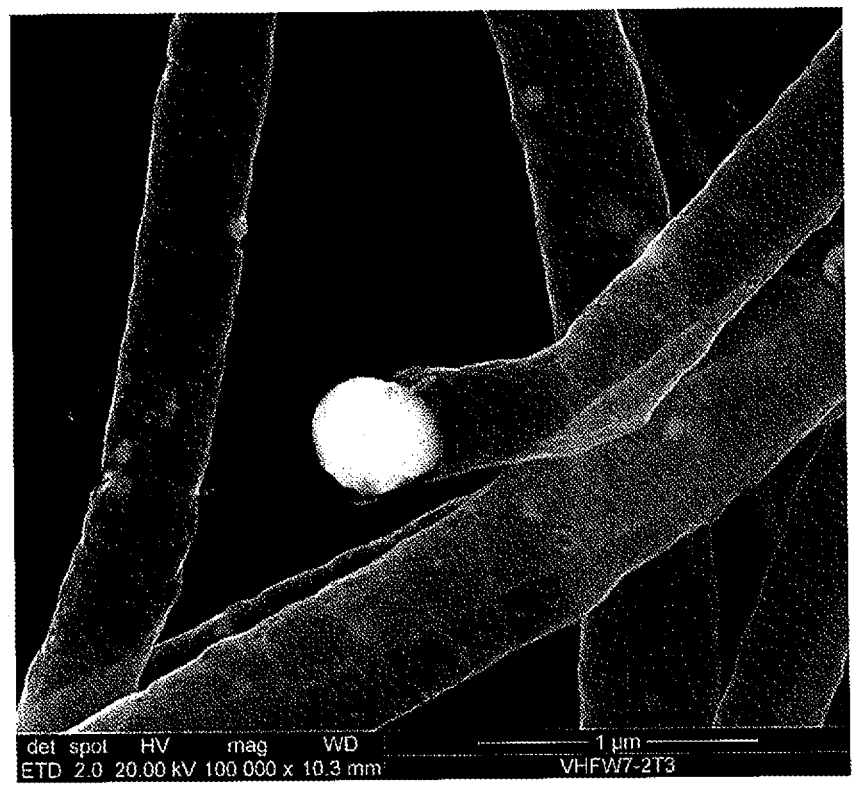

A solution of 10.0 g of cyanamide (Aldrich, 99%) and 0.26 g of cobalt acetate ($Co(CH_3COO)_2$, Aldrich, 98%) in 125 ml of reagent alcohol (Fisher, Ethyl alcohol 90% v/v, methyl alcohol 5% v/v, isopropyl alcohol 5% v/v) was prepared by stirring the mixture on a magnetic hotplate for about 1.2 hour at 60° C. using a condenser to prevent evaporation of the alcohol. Afterward, the solvent was evaporated on the magnetic hotplate with stirring at 45° C. overnight. The solid that was produced was pyrolyzed by heating it a furnace at 950° C. for 30 minutes under a flowing atmosphere if nitrogen gas and then reducing the temperature of the furnace at a rate of 30° C. per minute while the inert atmosphere of nitrogen continued to flow. FIGS. 2a and 2b show highly magnified images (×10,000 and ×100,000, respectively) of the product.

EXAMPLE 3

Figure 3A:
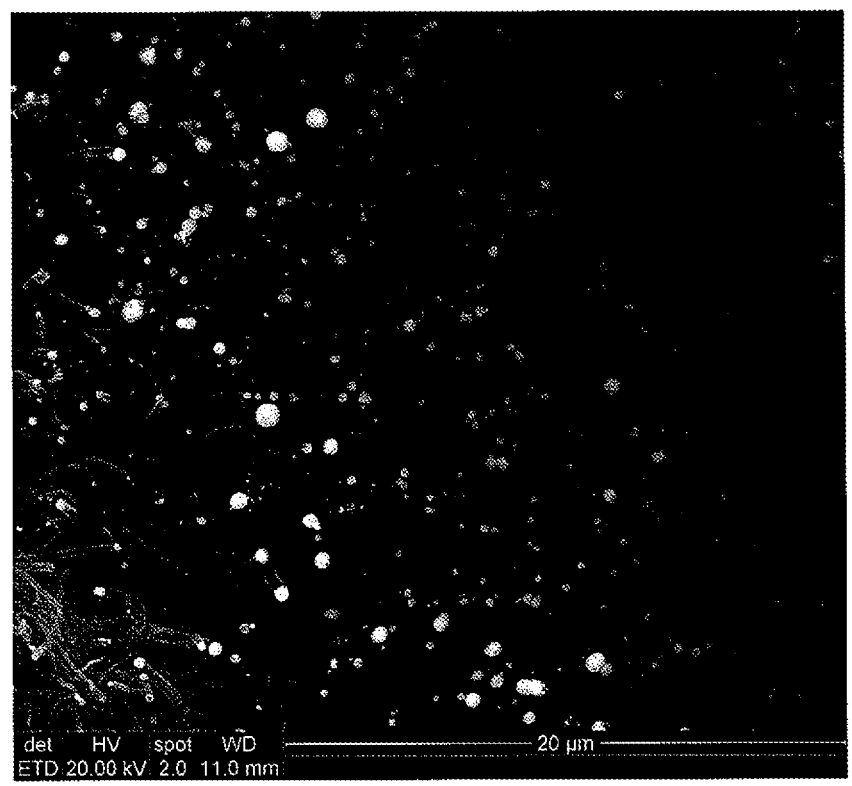
FIGS. 3a and 3b show magnified images of nitrogen-doped tubes produced using cyanamide and nickel acetate in reagent grade ethanol solvent.
Figure 3B:
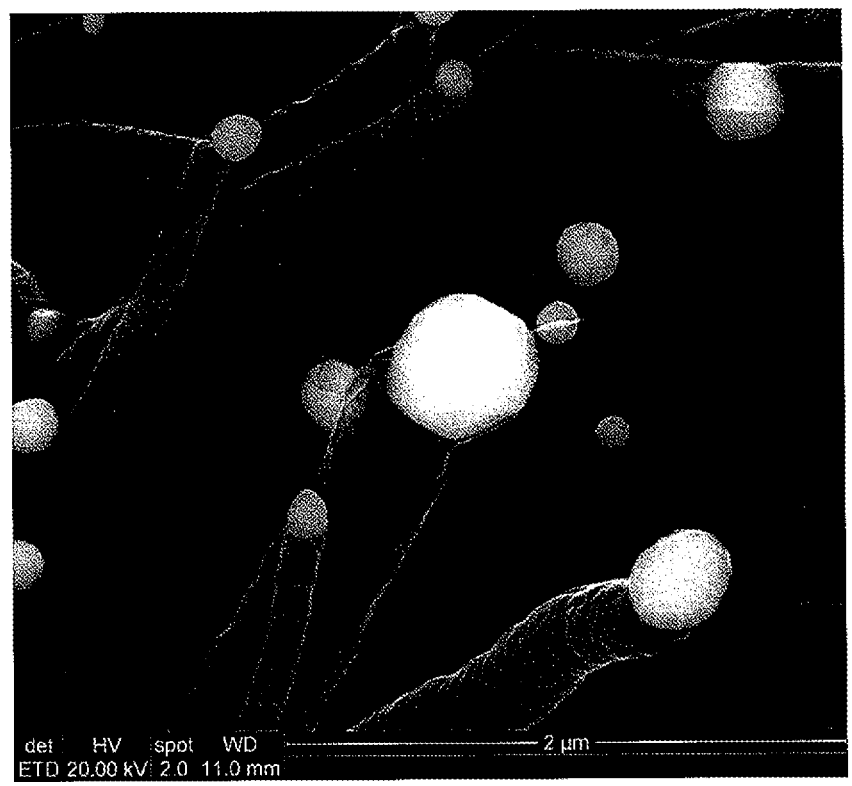

A solution of 10.0 g of cyanamide (Aldrich, 99%) and 1.29 g of nickel acetate ($Ni(CH_3COO)_2$, Aldrich, 99.998% Aldrich, 98%) in 125 ml of reagent alcohol (Fisher, Ethyl alcohol 90% v/v, methyl alcohol 5% v/v, isopropyl alcohol 5% v/v)

was prepared by stirring the mixture on a magnetic hotplate for about 12 hour at 60° C. using a condenser to prevent evaporation of the alcohol. Afterward, the solvent was evaporated on the magnetic hotplate with stirring at 45° C. overnight. The solid that was produced was pyrolyzed by heating it a furnace at 950° C. for 30 minutes under a flowing atmosphere of nitrogen gas and then reducing the temperature of the furnace at a rate of 30° C. per minute while the inert atmosphere of nitrogen continued to flow. FIGS. 3a and 3b show highly magnified (×10,000 and ×100,000, respectively) images of the product. The average length of the tubes is about 100 micrometers. The average diameter of the tubes was about 0.7 micrometers.

EXAMPLE 4

Figure 4:
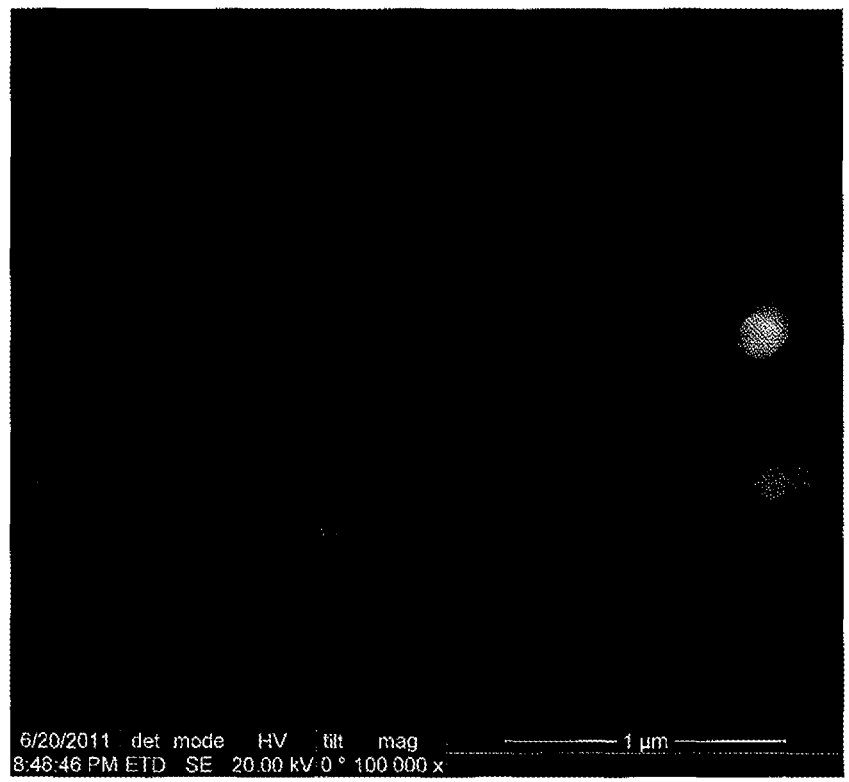
FIG. 4 shows a magnified image of nitrogen-doped tubes produced using cyanamide and nickel acetate in water solvent.

A solution of 10.0 g of cyanamide (Aldrich, 99%) and 1.29 g of nickel acetate (Ni($CH_3COO$)$_2$, Aldrich, 99.998% Aldrich, 98%) in 125 ml of DI water was prepared by stirring the mixture on a magnetic hotplate for about 12 hour at 60° C. using a condenser to prevent evaporation of the water. After stirring, the solvent was evaporated on the magnetic hotplate with stirring at 45° C. overnight. The solid that was produced was pyrolyzed under an inert atmosphere of flowing nitrogen by heating it a furnace at 950° C. for 30 minutes and then reducing the temperature of the furnace at a rate of 30° C. per minute while the inert atmosphere of nitrogen continued to flow. FIG. 4 shows a highly magnified (×100,000) image of the product.

EXAMPLE 5

Figure 5A:
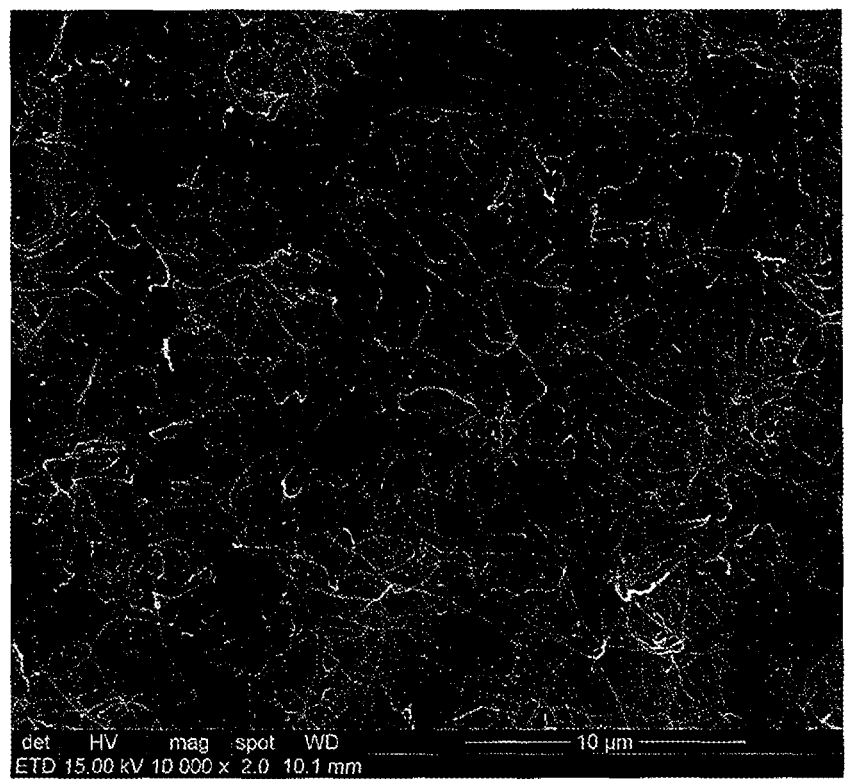
FIGS. 5a and 5b show highly magnified (×10,000 and ×100,000, respectively) images of a nitrogen-doped carbon tube product prepared using cyanamide and nickel acetate. The average length of the tubes is about 10 micrometers. The average diameter of the tubes is about 50 nanometers.
Figure 5B:
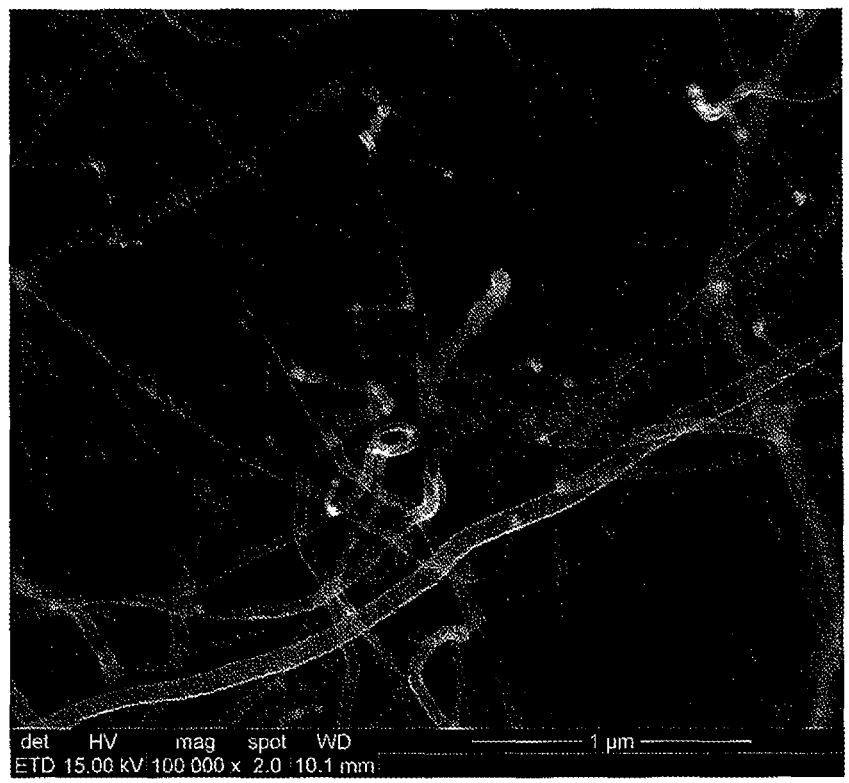

A solution of 10.0 g of cyanamide (Aldrich, 99%) and 1.29 g of nickel acetate (Ni($CH_3COO$)$_2$, Aldrich, 99.998% Aldrich, 98%) in 125 ml of reagent alcohol (Fisher, Ethyl alcohol 90% v/v, methyl alcohol 5% v/v, isopropyl alcohol 5% v/v) was prepared by stirring the mixture on a magnetic hotplate for about 12 hour at 60° C. using a condenser to prevent evaporation of the alcohol. After stirring, the solvent was evaporated on the magnetic hotplate with stirring at 45° C. overnight. The solid that was produced was pyrolyzed under an inert atmosphere of flowing nitrogen for about three minutes by placing the sample into a furnace at 950° C. for 3 minutes under a flowing atmosphere of nitrogen gas and then removing the sample from the hot zone of the furnace while continuing a flow of nitrogen gas over the sample. FIGS. 5a and 5b show highly magnified (×10,000 and ×100,000, respectively) images of the product. The average length of the tubes is about 10 micrometers. The average diameter of the tubes is about 50 nanometers. This Example produced nitrogen-doped tubes having a much narrower average diameter compared to Examples 1 through 4 where pyrolysis was continued for a longer period of time. The result suggest that the longer the pyrolysis times (30 minutes plus a longer cool down period) allowed metal particles to grow in size before tube growth began, which led to nitrogen-doped carbon tubes having larger diameters than for Example 5 where the pyrolysis time was much shorter and cool down was rapid. This observation is consistent with the belief that the diameters of the tubes are controlled by the sizes of the metal particles that catalyze tube growth.

EXAMPLE 6

Figure 6A:
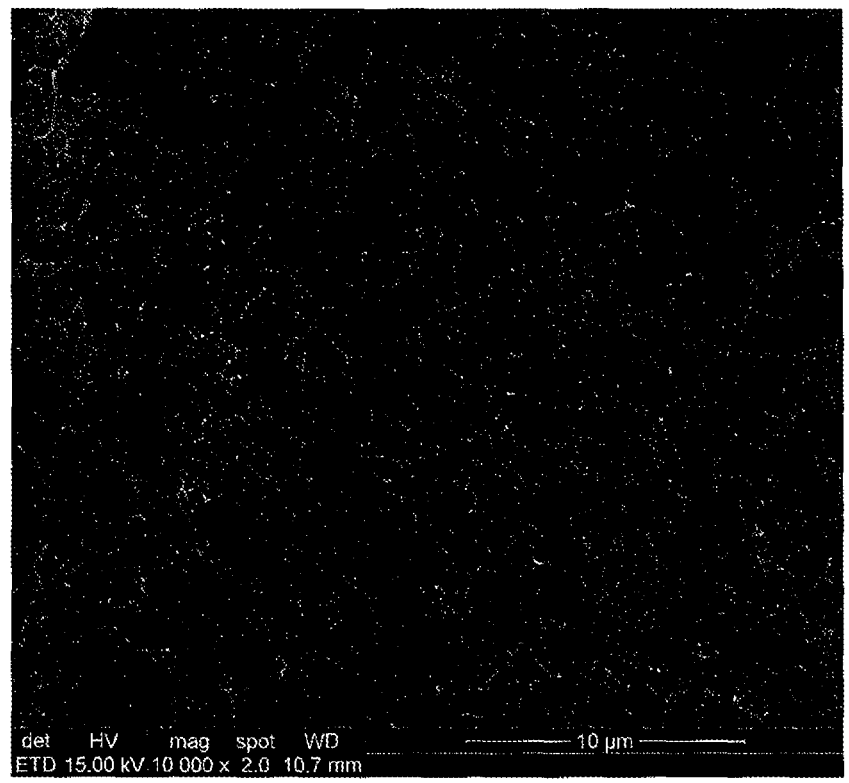
FIGS. 6a and 6b show highly magnified (×10,000 and ×100,000, respectively) images of a nitrogen-doped carbon tube product prepared using cyanamide and nickel acetate. The pyrolysis conditions included heating at 950C. for three minutes and cooling rapidly under nitrogen gas. The average length of the tubes is about 10 micrometers. The average diameter of the tubes is about 50 nanometers.
Figure 6B:
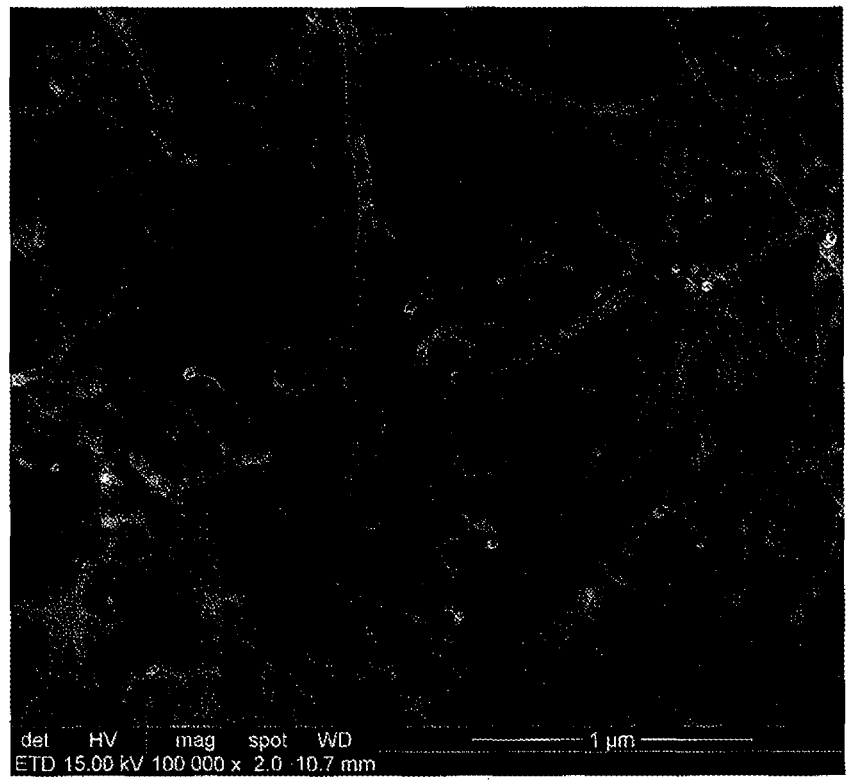

A solution of 10.0 g of cyanamide (Aldrich, 99%) and 1.29 g of nickel acetate (Ni($CH_3COO$)$_2$, Aldrich, 99.998% Aldrich, 98%) in 125 ml of DI water was prepared by stirring the mixture on a magnetic hotplate for about 12 hour at 60° C. using a condenser to prevent evaporation of the alcohol. After stirring, the solvent was evaporated on the magnetic hotplate with stirring at 45° C. overnight. The solid that was produced was pyrolyzed under an inert atmosphere of flowing nitrogen for about three minutes by placing the sample into a furnace at 950° C. for 3 minutes under a flowing atmosphere of nitrogen gas and then removing the sample while continuing a flow of nitrogen over the sample. FIGS. 6a and 6b show highly magnified (×10,000 and ×100,000, respectively) images of the product. The average length of the tubes is about 10 micrometers. The average diameter of the tubes is about 50 nanometers. This Example produced nitrogen-doped tubes having a much narrower average diameter compared to Examples 1 through 4 where pyrolysis was continued for a longer period of time. The result, which is consistent with Example 5, suggests that the longer the pyrolysis times (30 minutes plus a longer cool down period) allowed metal particles to grow in size before tube growth began, which led to nitrogen-doped carbon tubes having larger diameters than for Example 5 where the pyrolysis time was much shorter and cool down was rapid. This observation is consistent with the belief that the diameters of the tubes are controlled by the sizes of the metal particles that catalyze tube growth.

EXAMPLE 7

Figure 7A:
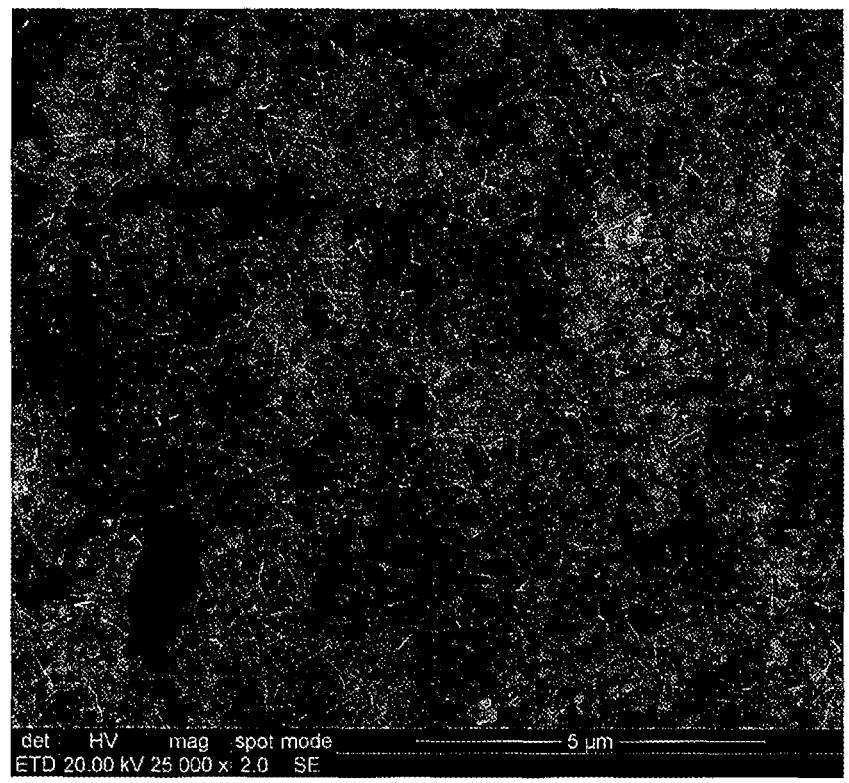
FIGS. 7a and 7b show highly magnified (×25,000 and ×100,000, respectively) images of a nitrogen-doped carbon tube product using cyanamide and iron acetate and titanium oxide particles.
Figure 7B:
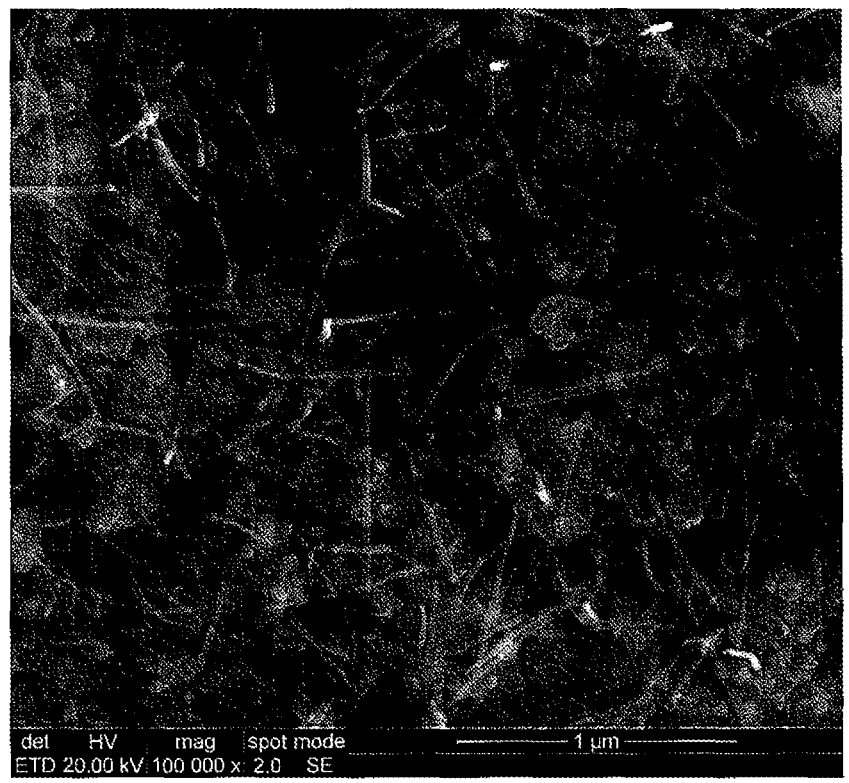

A solution of 10.0 g of cyanamide (Aldrich, 99%), 1.5 g of iron acetate (Fe($CH_3COO$)$_2$ (Aldrich, 95%), and ~1.0 g of $TiO_2$ nanoparticle (Aldrich, dispersed in water, 5 wt %) in 125 ml of reagent alcohol (Fisher, Ethyl alcohol 90% v/v, methyl alcohol 5% v/v, isopropyl alcohol 5% v/v) was prepared by stirring the mixture on a magnetic hotplate for about 12 hours at 60° C. using a condenser to prevent evaporation of the alcohol. Afterward, the solvent was evaporated from the solution on the magnetic hotplate with stirring at 45° C. overnight. The solid that was produced was pyrolyzed under an inert atmosphere of flowing nitrogen by heating it a furnace at 950° C. for 30 minutes and then reducing the temperature of the furnace at a rate of 30° C. per minute while the inert atmosphere of nitrogen continued to flow. FIGS. 7a and 7b show highly magnified (×25,000 and ×100,000, respectively) images of the product.

In summary, a process for preparing nitrogen-doped tubes includes preparing a solution of cyanamide, and metal containing precursor(s) in a solvent, evaporating the solvent, and pyrolyzing the resulting solid under conditions suitable for carbonization of the cyanamide to form carbon tubes that are doped with a small amount of nitrogen. The pyrolysis time was shown to have an effect on the diameters of the tubes. A longer pyrolysis time was shown to product tubes having an average diameter that was larger than for a shorter pyrolysis time. Images of the tubes show particles of metal attached at the ends of the tubes. The sizes of the particles appear to be about the same as the diameter of the tubes. Based on these observations, it is believed that a longer pyrolysis time allows for larger particles of metal to form that subsequently catalyze the synthesis of the tubes with larger diameters. Smaller particles of metal produce narrower tubes than larger particles of metal do.

The foregoing description of the invention has been presented for purposes of illustration and description and is not intended to be exhaustive or to limit the invention to the precise form disclosed, and obviously many modifications and variations are possible in light of the above teaching.

The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

References

The following references are incorporated by reference herein.

[1] Wiggins-Camacho et al., "Effect of Nitrogen Concentration on Capacitance, Density of States, Electronic Conductivity, and Morphology of N-Doped Carbon Nanotube Electrodes" J. Phys. Chem. C. vol. 113, pp. 19082-19090, October 2009.

[2] Gong et al., "Nitrogen-Doped Carbon Nanotube Arrays with High Electrocatalytic Activity for Oxygen Reduction," Science, vol. 323, pp. 760-764, February 2009.

[3] Meng et al., "pH-effect on oxygen reduction activity of Fe-based electro-catalysts," Electrochem. Commun., vol. 11, pp. 1986-1989, August 2009.

[4] Qu et al., "Nitrogen-Doped Graphene as Efficient Metal-Free Electrocatalyst for Oxygen Reduction in Fuel Cells," ACS Nano., vol. 4, pp. 1321-1326, February 2010.

[5] Nagaiah et al., "Nitrogen-doped carbon nanotubes as a cathode catalyst for the oxygen reduction reaction in alkaline medium," Electrochem. Commun., vol. 12, pp. 338-341, December 2009.

[6] Liu et al., "Nitrogen-Doped Ordered Mesoporous Graphitic Arrays with High Electrocatalytic Activity for Oxygen Reduction," Angew. Chem. Int. Edit., vol. 49, pp. 2565-2569, March 2010.

[7] Yang et al., "Efficient Metal-Free Oxygen Reduction in Alkaline Medium on High-Surface-Area Mesoporous Nitrogen-Doped Carbons Made from ionic Liquids and Nucleobases," J. Am. Chem. Soc., vol. 133, pp. 206-209, December 2010.

[8] Carrero-Sanchez et al., "Biocompatibility and Toxicological Studies of Carbon Nanotubes Doped with Nitrogen" Nano lett., vol. 6, pp. 1609-1616, (2006).

[9] Shanmugam et al., "Efficient electrocatalytic oxygen reduction over metal free-nitrogen doped carbon nanocapsules," Chem. Commun., vol. 47, pp. 4463-4465, (2011).

What is claimed is:

1. A method for synthesizing nitrogen-doped carbon tubes comprising:
   preparing a solution comprising aminomethanenitrile ($NCNH_2$) and a suitable transition metal-containing salt in a solvent to form a transition metal complex,
   evaporating the solvent to form a solid, and
   pyrolyzing the solid under an inert atmosphere under conditions suitable for the production of nitrogen-doped carbon tubes from the solid wherein the step of pyrolyzing the solid comprises heating the solid from about 850 degrees Celsius to about 1050 degrees Celsius.

2. The method of claim 1, wherein the step of preparing a solution comprises combining aminomethanenitrile ($NCNH_2$) and a suitable transition-metal-containing salt in a solvent and heating to form a solution.

3. The method of claim 1, wherein the suitable transition metal-containing salt comprises a metal selected from cobalt, nickel, iron, or mixtures thereof.

4. The method of claim 1, wherein the suitable transition metal-containing salt is selected from cobalt carboxylate, nickel carboxylate, iron carboxylate, and mixtures thereof.

5. The method of claim 1, wherein the step of pyrolyzing the solid comprises heating the solid at 950 degrees Celsius.

6. The method of claim 1, wherein the solvent comprises an alcohol.

7. The method of claim 5, wherein the solvent comprises ethanol.

8. The method of claim 1, wherein the solvent comprises water.

9. The method of claim 5, wherein the solid is heated for three minutes and then cooled rapidly.

10. The method of claim 9, wherein the nitrogen-doped carbon tubes are nanotubes.

11. The method of claim 1, wherein the nitrogen-doped tubes include microtubes.

\* \* \* \* \*